April 15, 1969  C. B. PEAR, JR  3,439,355
FLUX-RESPONSIVE HEAD
Filed Oct. 20, 1965

INVENTOR
CHARLES B. PEAR, Jr.

*Hurvitz & Rose*

ATTORNEYS

3,439,355
FLUX-RESPONSIVE HEAD
Charles B. Pear, Jr., Eau Gallie, Fla., assignor to Radiation Incorporated, Melbourne, Fla., a corporation of Florida
Filed Oct. 20, 1965, Ser. No. 498,612
Int. Cl. G11b 5/20, 5/24
U.S. Cl. 340—174.1                     6 Claims The present invention relates generally to magnetic flux responsive transducers for detection or recording of signals on a magnetic medium. The invention will be particularly described and discussed as it relates to devices for sensing the flux field of a magnetic record; that is, a medium upon which signals have been magnetically recorded, to reproduce the recorded signals on command, but it will become apparent that the invention may also be utilized for "writing" on the magnetic medium.

Briefly, the present invention comprises a ring core magnetometer, of the type disclosed and discussed, for example, by Geyger in "Communications and Electronics," Mar. 1962 (No. 59), pp. 65–73, from which a pair of core extensions project to form a gap having dimensions suitable for collection of flux from a short section of the magnetic record. The ring core is preferably fabricated of a ferrite material having a substantially rectangular hysteresis loop to permit rapid switching of the core into opposite polarity saturation states. A D.C. current is applied to a bias winding on a ring core to maintain the core in a flux saturated condition of one polarity. Excitation windings about the core are driven by an interrogation pulse when a reading is desired. The excitation windings are arranged such that in the absence of any external signal flux from the magnetic record each half of the core switches simultaneously with the other half. Differentially connected, substantially identical balanced output windings about the core will therefore produce zero output voltage since the exciting flux is equal and opposite in the two halves of the core. When, however, external signal flux is present concurrently with the application of an interrogation pulse at the excitation windings the additional flux in each half of the core respectively aids and opposes the switching MMF so that the switching time of the core halves differ with respect to one another. The output winding voltages are no longer equal and hence a differential output voltage is produced having amplitude and polarity related to that of the external signal flux.

It will be apparent that this mode of operation substantially differs from that of previous gated modulator heads in that with the present invention the sensed flux time modulates relatively large flux changes in the core rather than being itself time modulated by the excitation voltage. The operation of transducers in accordance with the present invention will readily suggest to persons skilled in the art that it is useful in detecting changes in the fundamental, as is required in pulsed operation, as well as in providing improved operation with conventional second harmonic sensing.

In one form of prior art magnetic signal transducer, the core structure includes first and second loops arranged in mutually perpendicular planes. One of the loops is closed and has windings thereon which are excited by pulses of sufficient amplitude to drive the closed loop from an initial state of saturation to a state of saturation of opposite polarity. To the extent that the closed loop is driven into oppositely polarized saturation states, this type of prior art transducer is similar in operation to the flux responsive transducer of the present invention. This similarity ends, however, in that the former has a winding or windings on the second loop which contains the flux translating gap. It operates on the principle that, during the transition between oppositely poled conditions of saturation, the normally high reluctance of the closed loop is reduced to permit external signal flux to traverse the second loop, thus inducing the signal in the winding or windings thereon. Transducers in accordance with the present invention are capable of significantly improved operation over the prior art type which has just been described in that (1) operation is based on differences in switching times of the core halves rather than on varying flux path reluctance; (2) the ring core portion may be fabricated of rapid switching square loop ferrite material thereby enhancing efficiency, particularly for heads to be operated with pulse excitation; (3) the output is derived from differentially connected winding so that source impedance is low, further improving efficiency; (4) the differential connection facilitates balancing to suppress excitation signals at the output windings, also improving pulse operation; (5) location of output windings on the ring core and subjection of the ring core portions to different switching times increases output voltage dependence upon variations in external signal flux over that obtained by positioning output windings on the open loop portion of the core and varying the reluctance of the flux path.

In a second form of prior art magnetic signal transducer, a closed loop saturable core of balanced construction is provided with excitation and detection windings and a pair of magnetic legs terminating in a gap. The legs are positioned adjacent the magnetic record, and high frequency voltages are applied to the excitation windings. The external signal flux passes through the gap in the legs and through the two branches of the closed loop core. During alternate half cycles of excitation current, first one branch and then the other is subjected to greater flux intensity than the opposite branch since the signal flux and excitation flux will, during those intervals, be in the same direction. When the closed loop is driven close to or into saturation, in conjunction with the core construction and winding configurations thereon, the fundamental frequency of exciting voltage is canceled in the detection windings, but the second harmonic is retained and varies in amplitude with signal flux intensity. The object of employing this type of prior art transducer is to provide a uniform frequency response during playback of the recorded signal, the induced signal being proportional to signal flux intensity.

With respect to the immediately preceding type of transducer, the present invention provides distinct advantages in capability of use with digital data systems where pulsed operation and fundamental frequency sensing are necessary, as well as in conserving power and in reducing the complexity of associated electronic circuitry. Moreover, transducers in accordance with the present invention will permit rapid switching of the saturable portion of the core to enhance signal detection and to improve efficiency. In still a third type of magnetic signal transducer, a magnetic circuit is employed which comprises a core having non-linear polarization characteristics. Again, the core has closed loop and open loop portions, the latter including the signal translation gap. Both input and output windings are located at the closed loop portion of the core, and in addition, a direct current winding is disposed along the closed loop portion. The purpose of the latter is purportedly to impose a balanced load on the output windings and the presence of signal flux at the gap results in the usual higher harmonic detection. Only one output winding is employed and a high input impedance amplifier is required to be connected to the output winding to prevent loading of the output signal. Again, the present invention has several advantages over this third type of magnetic signal transducer, corresponding to the advantages discussed earlier.

It is, accordingly, a primary object of the present invention to provide an improved magnetic signal transducer.

It is a further object of the present invention to provide a magnetic signal transducer which is capable of improved pulse excitation and sensing operations.

It is a further object of the present invention to provide a ring core magnetometer type of transducer for sensing the flux field of a magnetic recorded medium wherein the core halves are subjected to different switching times to effect transduction of the external signal flux.

These and still further objects, features and attendant advantages of the present invention will become apparent from a consideration of the following detailed description of specific embodiments thereof, especially when taken in conjunction with the accompanying drawings in which.

Figure 1:
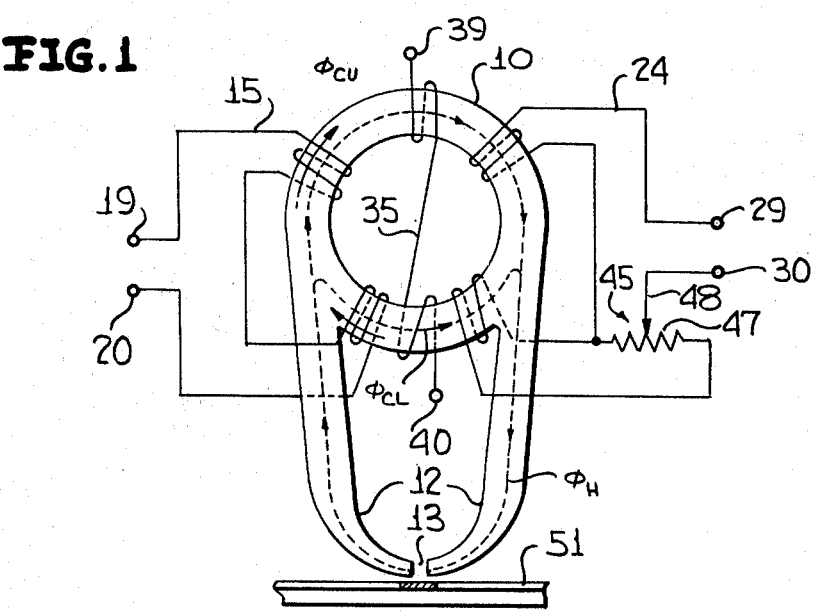
FIGURE 1 is a schematic diagram of a magnetic signal transducer in accordance with the present invention.

Referring now to FIGURE 1, a ring core magnetometer 10 has a pair of extensions or projecting legs 12 whose opposing pole faces form a gap 13. An input or excitation winding 15 is wound about the upper and lower portions of the ring core such that the upper and lower portions of the winding are series aiding, and extends to a pair of terminals 19 and 20 to which a suitable source of excitation (not shown) is to be connected. An output winding 24 similarly has a pair of portions of its coil wound about the upper and lower portions of the ring core, except that in this case the upper and lower portions of the output winding are differentially wound or connected. The ends of the output winding extend to a pair of terminals 29 and 30 to which appropriate load or detection circuitry (not shown) may be connected. The ring core may also have wound thereon a bias winding 35, again wound about both the upper and lower portions of the ring core and extending to a pair of terminals 39, 40 to which a direct current source is to be coupled.

The ring core 10 is preferably of the type discussed in the aforementioned Geyger publication and is preferably fabricated of a rapid switching rectangular loop ferrite material. The magnetic extensions or legs 12 are preferably constructed of a material having high initial permeability and low coercivity and are preferably separately fitted lapped pieces cemented to ring core 10.

In operation of the flux responsive head of FIGURE 1, a magnetic record such as magnetic tape 51 upon which suitable signals have been recorded is displaced relative to gap 13, such as by being moved adjacent the gap or by being pulled through the gap, in a well known manner.

Figure 2:
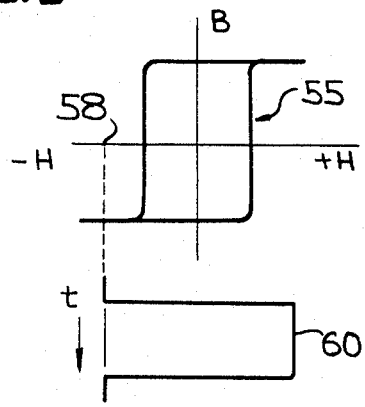
FIGURE 2 is an idealized representation of the magnetization curve of the ring core portion of the transducer of FIGURE 1 along with an idealized representation of the excitation pulse.

The B–H magnetization curve of ring core 10 is a substantially rectangular loop, as somewhat ideally illustrated in FIGURE 2. A D.C. current is continuously applied to terminals 39, 40 of the bias winding 35 to hold core 10 in the negatively saturated flux condition, as illustrated in FIGURE 2 at the portion of the curve designated 58. When a reading of the external signal recorded on magnetic tape 51 is desired, an excitation pulse sufficient to switch the core flux to the positive saturation region 59 is applied to excitation winding 15 via terminals 19 and 20. Pulse 60 of FIGURE 2 is suitable for such purpose since it overcomes the negative bias producing negative saturation of the core to switch the upper and lower portions of the core 10 to the positive saturation region during the interval of pulse width.

When no external signal flux, $\phi_h$, is present, both halves, i.e. both upper and lower portions of the ring core, will switch substantially simultaneously to produce a differential output of zero at output winding terminals 29 and 30, to which suitable detection circuitry is connected. That is, the flux threading both the upper and lower portions of the core, when an excitation pulse 60 is applied to winding 15 and no external signal is present on the tape, will cause both portions or halves of the core to switch from the negative to the positive saturation region at the same time, substantially as shown by the solid rise line of switching pulse 66 in FIGURE 4. Any slight differences in the upper and lower portions of the magnetic circuit, including core halves and output windings, may be readily balanced by adjusting potentiometer 45, which comprises resistance 47 and movable tap or slider 48, for zero output under the above-stated conditions.

Figure 4:
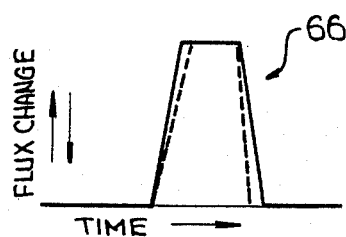
FIGURE 4 is a graph illustrating differences in switching times between the two halves of the core structure of FIGURE 1 during transduction of external signals.

When external signal flux $\phi_h$ is present, as illustrated by the dotted lines and arrows in FIGURE 1, it will aid the switching MMF in one-half of the core and oppose it in the other so that the two halves have different switching times, as illustrated by the solid and dotted lines in FIGURE 4. In FIGURE 1, the dotted lines indicate the external signal flux $\phi_h$ and the solid lines indicate the excitation pulse which causes switching of the halves of the core. The switching MMF in the upper portion of core 10 is aided by the external signal flux, while the switching MMF in the lower portion of the core is opposed by the external signal flux. Thus, the upper portion of core 10 switches more rapidly than does the lower portion, the flux changes versus time for each being illustrated respectively by the solid and dotted lines in FIGURE 4. Similarly, when the pulse is removed from excitation winding 15, flux is induced in the core in a direction opposite that shown by the solid lines in FIGURE 1. Therefore, during the change from positive to negative saturation, the aiding excitation and signal fluxes will produce more rapid switching in the lower core portion than in the upper portion where opposing fluxes are present. Switching time for the lower and upper halves is again illustrated by the dotted and solid lines, respectively, at the back edge of the flux change-versus-time graph of FIGURE 4.

In this manner, when both external signal flux and flux created by the excitation signal on winding 15 are present in the halves of the core 10, the upper and lower coil voltages of output winding 24 are no longer equal and a differential output voltage is produced at terminals 29 and 30. This output voltage will have an amplitude and polarity related to the amplitude and polarity respectively of external signal flux $\phi_h$. The sensed external signal flux will, in this manner, time modulate relatively large flux changes, i.e. the changes produced by the external biasing and excitation signals in the core rather than being time modulated itself by the excitation.

Since the output signal is obtained from differentially connected windings, the source impedance is small and efficiency is improved. In addition, the differential connection of the output winding 24 facilitates balancing, as by potentiometer 45, to remove excitation from the output, which is extremely important for pulse excitation or interrogation.

Figure 3:
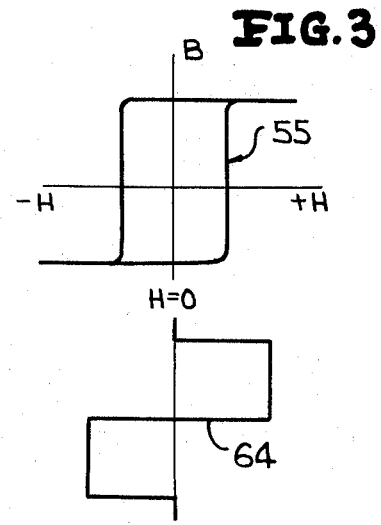
FIGURE 3 is an alternative form of excitation pulse.

Continuous D.C. biasing of the ring core 10 may be dispensed with by using an excitation pulse having a shape 64 (FIGURE 3) with a first portion sufficient to drive the normally unsaturated core into the positive flux saturation region, followed immediately by a negative portion sufficient to drive the core halves to the negative flux saturation region. The results obtained in switching and output voltage are identical with those obtained using continuous biasing and unidirectional pulse 60, but improvement is attained to more than compensate for the more complex pulse shape by virtue of the fact that power is dissipated only when the magnetic head is interrogated.

To evaluate the flux responsive head of the present invention, and to compare its operation with a similar head having output windings on the core section and on the extensions, a practical form of the invention was constructed in which the ring section was a square loop ferrite core and the extensions were 14 mil laminations (Supermu 40) having fifty-five turn windings on each extension leg. Flux from a recorded tape was simulated by a ten turn winding about that part of the extensions at which the gap would be located. Each of the upper and lower portions of the excitation and output windings 15 and 24, respectively, were four turn windings, and bias winding 35 was a two turn winding. A D.C. bias current of 150 milliamperes applied to bias winding 35 maintained the ring core in a saturation state of one polarity and a peak pulse of 300 milliamperes applied to excitation winding 15 was sufficient to switch the core to the opposite polarity saturation state. Balancing of the differences in the two halves of core 10 was provided by a potentiometer of the type illustrated at 45.

With 10 milliamperes in the signal-simulating winding the output voltage of the eight turn (four turns on each half) differential winding 24 was a symmetrical pulse of five millivolts, having a width of approximately two microseconds. On the other hand, the output from the one hundred ten turn winding on the extensions was a pulse of approximately ten millivolts, having a rapid rise time but a relatively slow decay, and being about seven microseconds wide at 20 percent of peak amplitude. The comparison of location of output windings demonstrates the inherent advantages of the magnetometer configuration as well as illustrating the significant improvement obtained by providing output windings on the core itself rather than on the extensions.

It is to be emphasized, however, that the present invention does not preclude pulsed operation readout from windings on the legs, if desired, since such an arrangement still provides substantial improvement, with the structure which has been described, in operation over that attainable with prior art types of transducers. Moreover, it may be preferable to excite the core with the unipolar pulses so that there is not a complete switching, in order to provide a high ratio of desired pulse output to stray output coupled from the excitation. Alternate polarity pulses approximately 0.2 mil wide recorded on Univac metal tape have been sensed in this manner. However, the latter operation requires an extremely good balance to reduce the coupled output.

The flux responsive head illustrated in FIGURE 1 may also be employed for writing either by applying sufficient current to the output winding or by employing additional auxiliary "write" windings on the extensions 12. The magnetomotive force would, in either case, have to be sufficient to produce the writing field at the gap despite the high reluctance of a nearly saturated core. An A.C. excitation signal could be applied to the core for demagnetization thereof prior to each application of "write" current. Moreover, it would be desirable to use an A.C. signal on the "write" winding to demagnetize the core extensions following the writing operation.

While I have described certain specific embodiments by my invention, it will be apparent that various changes and modifications in the details of construction and operation may be resorted to without departing from the true spirit and scope of the invention. It is therefore desired that the present invention be limited only by the appended claims.

I claim:

1. Apparatus for translating magnetic signals, comprising a magnetic ring core having a substantially rectangular hysteresis loop, a pair of core extensions projecting from said ring core to form a gap and dividing said ring core into substantially equal half portions, a pair of excitation coils would in series-aiding relation about respective ones of said core half portions, a pair of detection coils differentially wound about respective ones of said core half portions, means for balancing the signal translation characteristics of said core half portions, means for applying core switching signals to said excitation coils to sequentially drive said ring core to alternately polarized states of flux saturation, said core half portions thereby switching simultaneously between said alternately polarized saturation states in the absence of magnetic signals at said gap, and deviating from simultaneous switching in the presence of magnetic signals at said gap to produce output signals on said detection coils having amplitude and polarity proportional to the amplitude and polarity respectively of said magnetic signals.

2. The combination according to claim 1 wherein is included means for biasing said ring core to one of said alternately polarized saturation states, and wherein said core switching signals are pulses of sufficient amplitude to drive said core half portions to a saturation state of polarity opposite to said one state during the interval of application thereof to said excitation coils.

3. The combination according to claim 1 wherein said means for balancing includes a potentiometer connected to said pair of detection coils to equalize the oppositely poled output signals obtained therefrom during said core switching in the absence of magnetic signals at said gap.

4. A transducer for magnetic signals comprising a flux responsive magnetic head having a first signal translating portion and a second saturable core portion included in said first portion, said second portion having a substantially rectangular hysteresis loop, means for switching said second portion between opposite polarity states of flux saturation so that distinctive portions of said second portion have different switching times only during the concurrent application of said magnetic signals to said first portion and said switching of said second portion, and means for differentially combining the output signals derived from flux variations in said distinctive portions of said second portion.

5. The combination according to claim 4 wherein said means for switching includes substantially balanced halves of said second saturable core portion forming said distinctive portions, a pair of windings coupled to respective ones of said core halves in series-aiding relation, and means for applying pulse signals to said pair of windings for driving said core halves into said states of flux saturation, said magnetic signals producing flux splitting between said core halves, said pulse signals producing flux circulating said core halves, whereby aiding and opposing fluxes are present in said core halves only during the simultaneous application of magnetic signals and pulse signals to said head to produce said different switching times.

6. The combination according to claim 5 wherein said means for differentially combining includes a pair of output coils differentially wound about respective ones of said core halves, variable resistance means for balancing the output signals induced in said pair of output coils during application of only said pulse signals to said core halves, so that output signal cancellation is produced during simultaneous switching of said core halves and an output difference signal is produced when said core halves switch at different times.

References Cited
UNITED STATES PATENTS

| | | | |
|---|---|---|---|
| 2,768,243 | 10/1956 | Hare | 179—100.2 |
| 2,901,549 | 8/1959 | Serrell | 179—100.2 |
| 2,915,597 | 12/1959 | Wanlass et al. | 179—100.2 |
| 3,016,427 | 1/1962 | Grant | 179—100.2 |
| 3,017,617 | 1/1962 | Quade | 179—100.2 |
| 3,375,332 | 3/1968 | Geyder | 179—100.2 |

TERRELL W. FEARS, *Primary Examiner.*

VINCENT P. CANNEY, *Assistant Examiner.*

U.S. Cl. X.R.

179—100.2